United States Patent [19]

Mohri et al.

[11] Patent Number: 6,106,800
[45] Date of Patent: *Aug. 22, 2000

[54] METHOD FOR PRODUCING ALPHA-ALUMINA POWDER

[75] Inventors: Masahide Mohri; Norio Matsuda; Shinichiro Tanaka; Yoshio Uchida; Yoshinari Sawabe; Hisashi Watanabe; Hiroshi Ogawa, all of Ibaraki, Japan

[73] Assignee: Sumitomo Chemical Co., Ltd., Osaka, Japan

[ * ] Notice: This patent issued on a continued prosecution application filed under 37 CFR 1.53(d), and is subject to the twenty year patent term provisions of 35 U.S.C. 154(a)(2).
This patent is subject to a terminal disclaimer.

[21] Appl. No.: 08/880,996

[22] Filed: Jun. 23, 1997

Related U.S. Application Data

[63] Continuation of application No. 08/492,047, filed as application No. PCT/JP94/01989, Nov. 25, 1994, abandoned.

[30] Foreign Application Priority Data

Nov. 25, 1993 [JP] Japan ................................... 5-321166
Nov. 30, 1993 [JP] Japan ................................... 5-299998

[51] Int. Cl.$^7$ ........................................................ C01F 7/02
[52] U.S. Cl. ............................................................ 423/625
[58] Field of Search ............................ 423/625; 23/313 R

[56] References Cited

U.S. PATENT DOCUMENTS

| | | | |
|---|---|---|---|
| 2,961,297 | 11/1960 | Fenerty | 423/132 |
| 3,175,883 | 3/1965 | Lindsay et al. | 423/133 |
| 3,262,754 | 7/1966 | Lindsay et al. | 423/133 |
| 3,950,507 | 4/1976 | Kuklina et al. | 423/625 |
| 3,961,036 | 6/1976 | Hamner et al. | 423/628 |
| 4,308,088 | 12/1981 | Cherdron et al. | 423/625 |
| 4,487,756 | 12/1984 | Mizrah et al. | 423/625 |
| 4,744,802 | 5/1988 | Schwabel | 501/12 |
| 4,797,139 | 1/1989 | Baner | 423/628 |
| 4,822,592 | 4/1989 | Misra | 423/625 |
| 4,847,064 | 7/1989 | Pearson | 423/625 |
| 5,149,520 | 9/1992 | Sucech et al. | 423/625 |
| 5,225,229 | 7/1993 | Martin et al. | 423/625 |
| 5,296,177 | 3/1994 | The et al. | 23/313 R |
| 5,302,368 | 4/1994 | Harato et al. | 423/625 |
| 5,340,781 | 8/1994 | Oda et al. | 423/625 |

FOREIGN PATENT DOCUMENTS

| | | |
|---|---|---|
| 281265 | 9/1988 | European Pat. Off. . |
| 0554908 | 8/1993 | European Pat. Off. . |
| 2623482 | 12/1977 | Germany . |
| 64-03008 | 1/1989 | Japan . |
| 64-33013 | 2/1989 | Japan . |
| 9015777 | 12/1990 | WIPO . |
| 95/14638 | 6/1995 | WIPO . |

OTHER PUBLICATIONS

62th CATSJ Meeting Abstract No. 2D105, no date.

*Primary Examiner*—Steven Bos
*Attorney, Agent, or Firm*—Sughrue, Mion, Zinn, Macpeak & Seas, PLLC

[57] ABSTRACT

Alpha alumina powder is produced by granulating at least one alumina starting material selected from group consisting of transition alumina and alumina compound to obtain particles and calcining the particles in a halogen-containing atmosphere which comprises a hydrogen halide gas, a halogen gas or a mixture of a halogen gas and steam and contains at least 0.1 % by volume of at least one halogen-containing gas selected from the group consisting of hydrogen halide gas and halogen gas.

By granulating the alumina starting material powder in the form of particles to increase a bulk density and calcining them in the presence of halogen, α-alumina powder having a regulated particle size and shape and a narrow particle size distribution and containing fewer agglomerated particles is produced at a high calcining efficiency.

9 Claims, 1 Drawing Sheet

METHOD FOR PRODUCING ALPHA-ALUMINA POWDER

This is a Continuation of application Ser. No. 08/492,047, filed Jul. 21, 1995 now abandoned, filed as PCT/5P94/4989, Nov. 25, 1994.

FIELD OF THE INVENTION

The present invention relates to a method for producing α-alumina powder having regulated particle size and particle shape and a narrow particle size distribution and contains fewer agglomerated particles at a high calcining efficiency.

PRIOR ART

Alpha-alumina powder is widely used as a raw material of an abrasive, a sintered body, and the like. But, the α-alumina powder which is produced by a conventional method such as the Bayer method is a polycrystal having a nonuniform shape, contains many agglomerated particles and has a wide particle size distribution. In addition, for some applications, an α-alumina purity is low.

Then, following modified methods have been proposed but, each has drawbacks as follows:

For example, Japanese Patent KOKAI Publication No. 131517/1991 discloses a method comprising melting aluminum hydroxide to which a flux is added and precipitating α-alumina, but a particle shape of the obtained α-alumina powder is nonuniform.

A hydrothermal method using aluminum hydroxide disclosed in Japanese Patent Publication No. 22886/1982 controls the particle size by the addition of corundum as a seed crystal. However, this production method is not effective industrially, since it produces α-alumina under a high pressure in a long time.

A method disclosed in Japanese Patent KOKAI Publication No. 97528/1984 comprising calcining aluminum hydroxide in the presence of a mineralizer can produce α-alumina powder having a uniform particle shape, but α-alumina powder contains remaining boron or fluorine which is used as a mineralizer in the production method and includes many agglomerates which are formed in a firing step.

As described above, the known methods have a drawback that the produced α-alumina powder has a low packing property and cannot be homogeneously packed since the control of the particle size of the produced α-alumina powder is difficult, the particle shape is nonuniform, α-alumina powder includes the many agglomerated particles which are polycrystal, or α-alumina powder has the wide particle size distribution.

As the result of extensive studies, it has been found that, when the alumina starting material is calcined in the presence of halogen in a specific concentration described below, α-alumina powder having regulated particle size and shape and a narrow particle size distribution is easily obtained. However, since transition alumina used as the starting material has a low bulk density of 0.1 g/cm², the packing property of the powder is still insufficient, and therefore a calcining efficiency is not necessarily sufficient.

To increase the bulk density, it is known to granulate the starting material powder. But, when the powder is granulated and then calcined, many agglomerated particles are formed.

SUMMARY OF THE INVENTION

As the result of further study, it has been found that, when the α-alumina powder is granulated to increase its bulk density and then the particles are calcined in an atmosphere containing at least 0.1% by volume of halogen, the α-alumina powder having the regulated particle size and shape and the narrow particle size distribution and containing less agglomerated particles can be obtained, and the present invention has been completed.

Accordingly, the present invention provides a method for producing α-alumina powder comprising the steps of granulating at least one alumina starting material selected from group consisting of transition alumina and alumina compounds to obtain particles and calcining said particles in a halogen-containing atmosphere which comprises a hydrogen halide gas, a halogen gas or a mixture of a halogen gas and steam and contains at least 0.1% by volume of at least one halogen-containing gas selected from the group consisting of hydrogen halide gas and halogen gas.

DETAILED DESCRIPTION OF THE INVENTION

Figure 1:
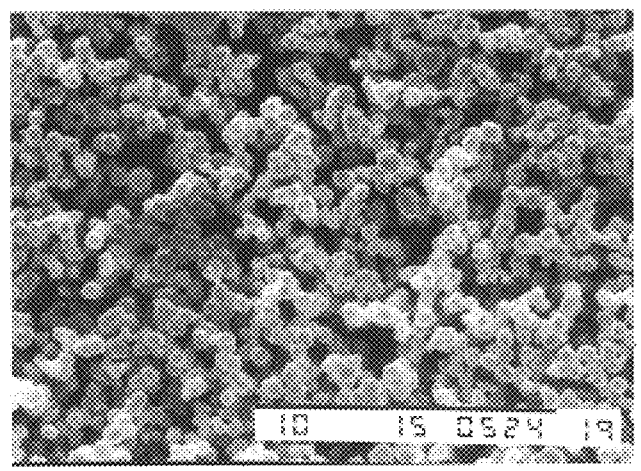
FIG. 1 is a scanning electron microscopic photograph (x4900) of the α-alumina powder produced in Example 5.

As a starting material in the production method of the present invention, transition alumina, an alumina compound or a mixture thereof is granulated and can be used. If necessary, a seed crystal, a shape-regulating agent or both of them can be added to the starting material and granulated.

The transition alumina used herein is intended to mean any alumina having a polymorph represented by $Al_2O_3$ except α-alumina. Specific examples of the transition alumina are γ-alumina, δ-alumina, θ-alumina, and so on.

The alumina compound to be used as a starting material is not limited. Examples thereof are aluminum hydroxide, aluminum sulfate, alum such as potassium aluminum sulfate and ammonium aluminum sulfate, ammonium aluminum carbonate, alumina gel which is obtained from aluminum by a submarine discharge method, and so on.

A preparation method of the transition alumina or the alumina compound is not limited. They may be prepared by any of conventional methods such as heat treatment of aluminum hydroxide, decomposition of aluminum sulfate, decomposition of alum, gas phase decomposition of aluminum chloride, decomposition of ammonium aluminum carbonate, a Bayer process, hydrolysis of an organic aluminum compound such as aluminum isopropoxide, a method using, as a raw material, an etching waste liquid recovered in a production of capacitors, and the like.

By the method of the present invention, it is possible to obtain desired α-alumina powder from aluminum hydroxide or transition alumina having a particle size of 10 μm or larger which is produced by an economical industrial method such as the Bayer process.

To control the particle size of α-alumina powder in a suitable range, a seed crystal is preferably added to the alumina starting material.

The seed crystal is intended to mean a crystal which functions as a growing site for the crystal growth of α-alumina powder. Any seed crystal can be used insofar as α-alumina particle can grow around it. Specific examples of the seed crystal are compounds such as oxides, nitrides, oxynitrides, carbides, carbonitrides, halides and borides of aluminum, titanium, vanadium, chromium, iron, nickel, etc. Among them, the oxides and nitrides are preferred. In particular, the oxides are preferably used.

These metal compounds may be used independently or as a mixture of two or more of them.

An amount of the seed crystal to be added is usually from $10^{-3}$ to 50 parts by weight, preferably from $10^{-3}$ to 30 parts by weight, more preferably from $10^{-3}$ to 10 parts by weight per 100 parts by weight of the starting material an amount of which is reduced to alumina. The amount of alumina herein used is intended to mean a net amount of alumina after subtracting a weight of absorbed water or crystal water which may be contained in the starting material transition alumina or aluminum hydroxide.

A primary particle size of the obtained α-alumina can be controlled by the number of the seed crystals. As the number of the seed crystals increases, the particle size decreases.

To add the seed crystal, various methods such as stirring, ball milling, ultrasonic dispersing, and the like can be used. Instead of the addition of seed crystal, abraded particles from a material of a mixing apparatus may be used to control the particle size of α-alumina powder. For example, when alumina balls are used in the ball mill, abraded particles of alumina are mixed as the seed crystal in the starting material to control the particle size of α-alumina powder.

To regulate the particle shape of α-alumina powder, a shape-regulating agent is preferably added to the starting material.

The shape-regulating agent functions during the growth of α-alumina crystal to regulate a D/H ratio (where D is the maximum particle size in a direction parallel to the hexagonal lattice plane and H is a particle size in a direction perpendicular to the hexgonal lattice plane) and crystal habit. Any material having such function can be used.

Examples of the shape-regulating agent are single metals such as magnesium, calcium, strontium, yttrium, zirconium, niobium, vanadium, molybdenum, copper, zinc, boron, silicon, lanthanum, cerium, neodymium, etc., and compounds of these metals such as oxides, nitrides, oxynitrides, carbides, carbonitrides, halides, borides, etc. Among them, the oxides are preferred.

The single metals and the metal compounds may be used independently or as a mixture of two or more of them.

Vanadium functions as the seed crystal also.

An amount of the shape-regulating agent is usually from $10^{-3}$ to 50 parts by weight, preferably from $10^{-3}$ to 30 parts by weight, more preferably from $10^{-3}$ to 10 parts by weight per 100 parts by weight of the starting material an amount of which is reduced to alumina.

As the shape-regulating agent which increases the D/H ratio, there is used magnesium, calcium, silicon, copper, molybdenum, niobium, zinc, zirconium, vanadium or strontium.

As the shape-regulating agent which decreases the D/H ratio, there is used lanthanum, cerium or neodymium.

When the crystal habit is to be controlled, as the shape-regulating agent for forming the n face, there is used lanthanum, cerium, neodymium or zirconium. To form the α-alumina particle having the c and r faces, calcium is used. To disappear the a face, zirconium is used. To form a hexagonal cylinder having the a and c faces, boron is used.

To add the shape-regulating agent, various methods such as ball milling, ultrasonic dispersing, and the like can be used. Alternatively, abraded particles from a material a mixing apparatus such as a mixing medium may be used as the shape-regulating agent.

To regulate the particle size and shape of α-alumina powder, the seed crystal and the shape-regulating agent are added at the same time. Thereby, α-alumina powder having a primary particle size and a particle shape which are suitable for an intended use can be produced.

In this case, a total amount of them is usually from $10^{-3}$ to 50 parts by weight, preferably from $10^{-3}$ to 30 parts by weight, more preferably from $10^{-3}$ to 10 parts by weight per 100 parts by weight of the starting material an amount of which is reduced to alumina.

In the present invention, the alumina starting material powder is used after granulation. A granulation method is not limited. For example, the powder can be granulated by a wet method such as stirring granulation, rolling granulation, fluidizing granulation, spraying granulation, etc. using a Henschel mixer, a vertical granulator, a spray drier, a pan type granulator, a roller compactor and so on with the addition of a binder such as water or an alcohol such as methanol, ethanol, isopropanol, etc.

When an apparent bulk density is increased to 0.15 g/cm³ or larger, since a packed amount of the particles is larger than the starting powder having the apparent bulk density of about 0.1 g/cm³, so that a calcining efficiency is improved, and other effects such as suppression of floating of the powder during processing, improvement of flowability, and so on are achieved.

In general, it is known that when a powder is granulated and its apparent bulk density is increased, productivity and workability are improved. However, when the raw material powder is granulated, the granulation leads to formation of agglomerated particles, whereby quality of a product is greatly decreased.

But, according to the method of the present invention in which the granulated particles are calcined in an atmosphere comprising the hydrogen halide gas, the halogen gas or the mixture of the halogen gas and steam in the concentration described below, and optionally the comminution step and the halogen-removing step are combined, the α-alumina powder can be produced with improving the productivity and workability are improved but forming no or few agglomerated particles.

Now, the step of calcining the particles of the starting material obtained by the granulation will be explained.

When the hydrogen halide is used in the firing step, a concentration of the hydrogen halide is at least 0.1% by volume, preferably at least 0.5% by volume, more preferably at least 1% by volume based on the whole volume of the atmosphere gas. To dilute the hydrogen halide, nitrogen, hydrogen, an inert gas such as argon, or an air can be used.

A pressure of the atmosphere gas containing the hydrogen halide is usually an atmospheric pressure, while it can be freely selected in an industrially used range. By calcining the starting material in such atmosphere gas, desired α-alumina powder is produced at a relatively low temperature.

A calcining temperature is usually from 500 to 1400° C., preferably from 600 to 1300° C., more preferably from 800 to 1200° C.

When the halogen gas is used in the sintering step, it is used in a concentration of at least 0.1% by volume, preferably at least 0.5% by volume, more preferably at least 1% by volume based on the whole volume of the atmosphere gas. To dilute the halogen gas, nitrogen, hydrogen, an inert gas such as argon, or an air can be used.

A pressure of the atmosphere gas containing the halogen gas is usually an atmospheric pressure, while it can be freely selected in an industrially used range. By calcining the starting material in such atmosphere gas, desired α-alumina powder is produced at a relatively low temperature.

A calcining temperature is usually from 950 to 1500° C., preferably from 1050 to 1400° C., more preferably from 1100 to 1300° C.

When the mixture of the halogen gas and steam is used in the sintering step, the halogen gas is used in a concentration of at least 0.1% by volume, preferably at least 0.5% by volume, more preferably at least 1% by volume, and the steam is used in a concentration of at least 0.01% by volume, preferably at least 0.1% by volume, more preferably at least 0.5% by volume, based on the whole volume of the atmosphere gas. To dilute the halogen gas, nitrogen, hydrogen, an inert gas such as argon, or an air can be used. The steam is supplied in a calcining furnace with nitrogen gas, and its volume percentage is controlled by the change of saturated steam pressure of water depending on a temperature.

A pressure of the atmosphere gas containing the mixture of the halogen gas and the steam is usually an atmospheric pressure, while it can be freely selected in an industrially used range. By calcining the starting material in such atmosphere gas, desired α-alumina powder is produced.

A calcining temperature is usually from 500 to 1400° C., preferably from 600 to 1300° C., more preferably from 800 to 1200° C.

When the starting material is calcined in the above atmosphere gas at the respective calcining temperature, α-alumina powder of which are hardly agglomerated and have the narrow particle distribution is produced at an industrially advantageous production rate.

The calcination is effected till the transition alumina or alumina compound grows to α-alumina crystal. The calcining time is preferably at least one minute, more preferably at least 10 minutes.

According to the method of the present invention, α-alumina powder is produced in relatively short time in comparison with the conventional methods.

A source of the atmosphere gas and a manner for supplying the atmosphere gas are not critical insofar as the atmosphere gas can be supplied to the reaction system in which the starting material such as the transition alumina is present. For example, as a source of the hydrogen halide gas or the halogen gas, a gas in a cylinder is generally used, while it is possible to use a halogen compound in a solid or liquid state, which is supplied so that the desired atmosphere composition is achieved.

As a solid or liquid source of the hydrogen halide gas, there are exemplified a solution of a hydrogen halide such as hydrofluoric acid, hydrochloric acid and hydroiodic acid; halogen-containing compounds such as ammonium halide (e.g. ammonium fluoride, ammonium chloride, ammonium bromide and ammonium iodide); halogen-containing polymers; and so on. Among them, ammonium chloride is preferred. For example, since ammonium chloride is sublimated at about 400° C., it is mixed with the starting material or supplied in the furnace together with the starting material and sublimated to form the atmosphere containing hydrogen chloride gas. When the calcination is carried out in a batch manner using ammonium chloride, ammonium chloride is completely decomposed at the calcining temperature in the present invention to form an atmosphere comprising 33% by volume of hydrogen chloride gas, 17% by volume of nitrogen gas and 50% by volume of hydrogen gas according to molar ratios. Then, the concentration of the hydrogen chloride can be adjusted by selecting the amount of charged ammonium chloride and a volume of the furnace.

As a solid or liquid source of the halogen gas, there are exemplified solid $K_2N_2F_6.KF$, solid iodide, liquid bromide, liquid bromic acid, halogen-containing polymers, and so on. They may be used in the similar way to ammonium chloride.

As the concentration of the hydrogen halide is higher, high purity α-alumina powder can be produced at a lower calcining temperature in a shorter calcining time.

The gas can be supplied in a batch manner or a continuous manner.

A type of a calcining apparatus is not limited, and any of conventional apparatuses may be used. A furnace is preferably made of a material which is not corroded by the hydrogen halide gas or the halogen gas, and comprises a mechanism for adjusting the atmosphere.

Since the acidic gas such as the hydrogen halide gas or the halogen gas is used, the furnace is preferably an airtight one. In the industrial production, a tunnel furnace, a rotary kiln, or a pusher furnace can be used.

An apparatus used in the method of the present invention such as a crucible or a boat is preferably made of alumina, quartz, acid-resistant brick, platinum, silicon carbide, mullite or graphite since the reaction proceeds in the acidic atmosphere.

To effectively carry out the calcination of the starting material in the industrial production, the solid or liquid hydrogen halide gas source and/or halogen gas source are supplied directly in the furnace and the starting material is continuously calcined in the atmosphere containing the hydrogen halide gas and/or the halogen gas.

In this case, the transition alumina and/or the alumina compound is calcined by supplying the solid or liquid hydrogen halide gas source, the solid or liquid halogen gas source or their mixture directly in the calcining furnace so as to form the atmosphere gas containing at least 1% by volume, preferably at least 5% by volume, more preferably at least 10% by volume of the hydrogen halide gas, the halogen gas or their mixture.

The halogen gas source and the steam can be supplied at the same time.

A concentration of the hydrogen halide gas or the halogen gas in the atmosphere of the calcining furnace in which the starting material is calcined is maintained in the above specified range. Then, the hydrogen halide gas source or the halogen gas source is supplied in an amount sufficient for maintaining such concentration. There is no disadvantage in supplying the hydrogen halide gas source or the halogen gas source in an excessive amount and it is not necessary to remove the unused gas source from the furnace.

Preferably, the solid or liquid hydrogen halide gas or halogen gas source is supplied directly in the calcining furnace. The gas source may be supplied independently or as a mixture with the alumina starting material. For example, when a continuously running furnace in which the starting material is supplied at interval such as the pusher type tunnel furnace is used, the gas source is charged in a vessel in which the alumina starting material is charged and then placed in the furnace. In this case, a gas supplying equipment which is necessary when the gas bomb is used can be neglected.

To maintain the necessary concentration of the hydrogen halide gas and/or the halogen gas in a highest temperature homogeneously heating zone of the furnace, the hydrogen halide gas and/or the halogen gas which are generated by the decomposition of the gas sources are flowed preferably in parallel with the supply direction of the transition alumina and/or the alumina compound.

To supply the hydrogen halide gas and/or the halogen gas in parallel with the supply direction of the starting material, the gas is flowed from an entrance of the starting material towards the highest temperature homogeneously heating zone by conveying the gas with the nitrogen gas, or the gas is sucked from an exit of α-alumina powder by a blower. Thereby, the concentration of the hydrogen halide or halogen gas in the furnace atmosphere can be easily maintained in the specific range in the zone where the starting material is calcined.

Herein, the highest temperature homogeneously heating zone means a zone in which the transition alumina and/or the alumina compound is reacted with the hydrogen halide gas and/or the halogen gas and calcined. In the furnace, the temperature in this zone should be kept at the highest temperature most suitable for the reaction.

The calcining temperature is usually from 600° C. to 1400° C., preferably from 700° C. to 1300° C., more preferably from 800° C. to 1200° C. When the raw material is calcined in this temperature range, the α-alumina particles are less agglomerated, the powdery α-alumina having the narrow particle size distribution just after the calcination can be produced at the industrially advantageous production rate.

The calcining time is the same as described above.

While the continuous calcining furnace with which the starting material is continuously supplied and the product is continuously taken out such as the tunnel furnace or the rotary kiln is used, an electric heating type or indirect gas heating type tunnel furnace is preferably used.

In the present invention, since the starting material is calcined in the atmosphere containing the hydrogen halide gas, the halogen gas or the mixture of the halogen gas and the steam, the halogen may remain in the calcined product. In such case, the halogen is preferably removed from the product.

For example, since the fine α-alumina powder having the particle size of 1 μm or less has a large surface area, the bulk of the powder may contain 200 pm or larger of the halogen just after calcination. Even the α-alumina powder having the particle size of several gm may contain several ten ppm of the halogen.

When the α-alumina powder containing several hundred ppm or larger of the halogen is used, for example, as the raw material of the encapsulant, the corrosive halogen gas leaks out from the sealed IC and breaks aluminum wirings. Then, when the α-alumina powder is used in the applications in which the halogen ion will have the adverse affect such as the raw material of the single crystal, encapsulant, high purity sintered body, etc., the halogen is preferably removed.

To remove the halogen, the following methods may be employed.

a) The α-alumina powder containing the halogen is heated in an atmosphere of an air or nitrogen gas which may additionally contain at least 0.1% by volume, preferably at least 1% by volume, more preferably at least 10% by weight of at least one gas selected from the group consisting of steam, oxygen, hydrogen, carbon dioxide, an alcohol and ammonia, at a temperature of from 400° C. to 1400° C., preferably from 600° C. to 1200° C., more preferably from 800° C. to 1200° C. The treating time is at least 1 minute, preferably at least 10 minutes, more preferably at least 1 hour. For example, when the remaining concentration of the halogen is reduced to 10 ppm or less for some applications, the α-alumina powder is preferably heated in the atmosphere containing at least 1% by weight of the above additional gas at a temperature of at least 800° C. for at least 30 minutes.

b) The α-alumina powder containing the halogen is heated in an inert gas atmosphere at a temperature of from 600° C. to 1400° C., preferably from 900° C. to 1200° C., The treating time is at least 1 minute, preferably at least 30 minutes, more preferably at least 1 hour.

c) The α-alumina powder containing the halogen is heated under reduced pressure of 1 Torr or less, preferably 0.1 Torr or less at a temperature of from 400° C. to 1400° C., preferably from 700° C. to 1200° C. The treating time is at least 1 minute, preferably at least 10 minutes, more preferably at least 1 hour.

d), e) and f) The α-alumina containing the halogen is (d) washed with water, an alkaline solution (pH of 9 to 13) or an alcohol and then dried at a temperature of from 70° C. to 300° C., (e) heated in water, an alkaline solution (pH of 9 to 13) or an alcohol to a boiling point of the liquid and dried at a temperature of 70° C. to 300° C., or (f) treated in an autoclave containing water, an alkaline solution (pH of 9 to 13) or an alcohol at a temperature of from 70° C. to 200° C. and dried at a temperature of from 70° C. to 300° C.

A kind of the alkaline solution is not limited. For example, aqueous ammonia or an aqueous solution of sodium hydroxide is used with adjusting the pH in the above range.

A kind of the alcohol is not limited. For example, methanol or ethanol is used.

In the case of the treatment in the autoclave, when the treatment is carried out under the saturated vapor pressure of the solvent, the halogen can be effectively removed. To shorten the treatment time, the autoclave equipped with a pressurizing mechanism is preferably used.

Since an amount of the removed halogen is very small in any method, a commercially available calcining furnace or autoclave can be used.

When the α-alumina powder is very fine, since a part of the particles are slightly agglomerated, it is preferable to mill the powder for some applications.

The α-alumina powder may be milled before or after the removal of the halogen. In the industrial scale production facility, the process can be designed in the convenient order of the steps.

In the method of the present invention in which the starting material powder is granulated and then calcined, the halogen content may be sufficiently low in some cases. In such cases, the halogen-removing step is unnecessary. Then, the milling step can be carried out after the granulation and sintering steps.

The method of milling is not critical. For example, a jet mill, a vibration mill, a ball mill and the like can be used. Among them, the jet mill is preferred.

The agglomeration of the α-alumina powder produced by the method of the present invention is weak and can be dispersed by a small milling energy. For example, when the jet mill is used, the agglomerated powder of the present invention can be milled by a very low pressure of supplied air, for example, 1 to 6 kg/cm$^2$ at which the α-alumina powder produced by the conventional method cannot be sufficiently milled.

By the method of the present invention, it is possible to produce the α-alumina powder having the regulated particle size and shape and the narrow particle size distribution and containing a small number of agglomerated particles at the high calcining efficiency.

PREFERRED EMBODIMENTS OF THE INVENTION

The present invention will be illustrated by the following Examples, which do not limit the scope of the present invention in any way.

In the Examples, the measurements were carried out as follows:

1. Measurement of Number Average Particle Size and Particle Size Distribution ($D_{90}/D_{10}$) of α-alumina Powder (1) The number average particle size is obtained by selecting 80 to 100 particles from a scanning electron microscopic photograph of the α-alumina taken by the scanning electron microscope T-300 manufactured by Nippon Electron Co., Ltd. and image analyzing them to calculate an average value of equivalent circle diameters of the particles and the distribution. The equivalent circle radius is a diameter of a circle having the same area as that of the particle.

(2) The $D_{90}/D_{10}$ ratio is measured by a master sizer (manufactured by Malvern Instrument, Inc.) which uses a laser beam scattering method as a measurement principle. $D_{10}$ and $D_{90}$ are particle sizes at the 10% accumulation and the 90% accumulation, respectively from the smallest particle size in the accumulated particle size distribution.

2. Measurement of Particle Shape (D/H ratio) of α-Alumina Powder

Herein, the particle shape is represented by the D/H ratio where D is the maximum particle size of the α-alumina particle having the hexagonal close-packed lattice in a direction parallel to the hexagonal lattice plane and H is a particle size in a direction perpendicular to the hexagonal lattice plane.

The D/H ratio is obtained by selecting 5 to 10 particles from a scanning electron microscopic photograph of the α-alumina powder taken by the scanning electron microscope T-300, measuring the D and H, calculating the D/H ratio of each particle and averaging the D/H ratios of 5 to 10 particles.

3. Measurement of a Concentration of Remaining Halogen

An amount of remaining halogen of 10 ppm or larger is measured by the X-ray fluorescent analysis. That is, the α-alumina powder is charged in a container having a diameter of 40 mm and irradiated by X-ray.

An amount of remaining halogen of less than 10 ppm is measured by the glow discharge mass spectroscopy. That is, the αalumina powder is deposited on an In wire and analyzed.

4. Apparent Density of Particles

The granulated starting material power (10 g) is charged in a 200 cc measuring cylinder, a volume is measured and then an apparent bulk density is calculated.

EXAMPLE 1

A transition alumina powder which is prepared by hydrolyzing an organic aluminum compound (AKP-G15 (trade name) manufactured by Sumitomo Chemical Co., Ltd.) (1 kg) was granulated with a vertical granulator (manufactured by Powrex Company) in the presence of water (1 kg), and dried at 120° C. for 1 hour to obtain particles.

The particles (600 g) were filled in a graphite boat and calcined in a cylinder furnace having a quartz muffle. The temperture was raised at a heating rate of 500° C./hr with flowing nitrogen gas. When the temperature reached 800° C., the bomb hydrogen chloride gas was supplied using nitrogen gas as a diluent gas. A concentration of hydrogen chloride in the furnace atmosphere was controlled by adjusting flow rates of the nitrogen gas and the hydrogen chloride gas by flow meters. The total flow amount of the atmosphere gas was adjusted to a linear velocity of 20 mm/min. A total pressure of the atmosphere gas was equal to the atmospheric pressure.

After reaching 1100° C., that temperature was maintained for 30 minutes and then cooled spontaneously to obtain α-alumina powder. The production conditions and the results are shown in Table 1.

EXAMPLE 2

In the same manner as in Example 1 except that the α-alumina powder obtained in Example 1 was heated in an air at 600° C. for 30 minutes to remove chlorine, the desired α-alumina powder was produced. The results are shown in Table 1.

EXAMPLE 3

As a starting material, aluminum hydroxide which was synthesized by hydrolyzing an organic aluminum compound was used. It was granulated and calcined at 800° C. to obtain particles. Then, the particles were treated in the same manner as in Example 1 to obtain α-alumina powder, which was heated in the air at 600° C. for 30 minutes to remove chlorine to obtain the desired α-alumina powder. The results are shown in Table 1.

EXAMPLE 4

The transition alumina powder (AKP-G15) (600 g) and, as a seed crystal, α-alumina powder (AKP-50 (trade name) manufactured by Sumitomo Chemical Co., Ltd.) (34.8 g) were mixed and the mixture was granulated and calcined in the same manner as in Example 1 to obtain α-alumina powder. This powder was heated in the air at 600° C. for 30 minutes to remove chlorine to obtain the desired α-alumina powder. The results are shown in Table 1.

EXAMPLE 5

The α-alumina powder obtained in Example 4 was milled by a jet mill (PJM-100SP manufacture by Nippon Pneumatic Industries Co., Ltd.) under air pressure of 6 kg/cm$^2$ at a powder supply rate of 2.4 kg/hr. The results are shown in Table 1.

Figure 2:
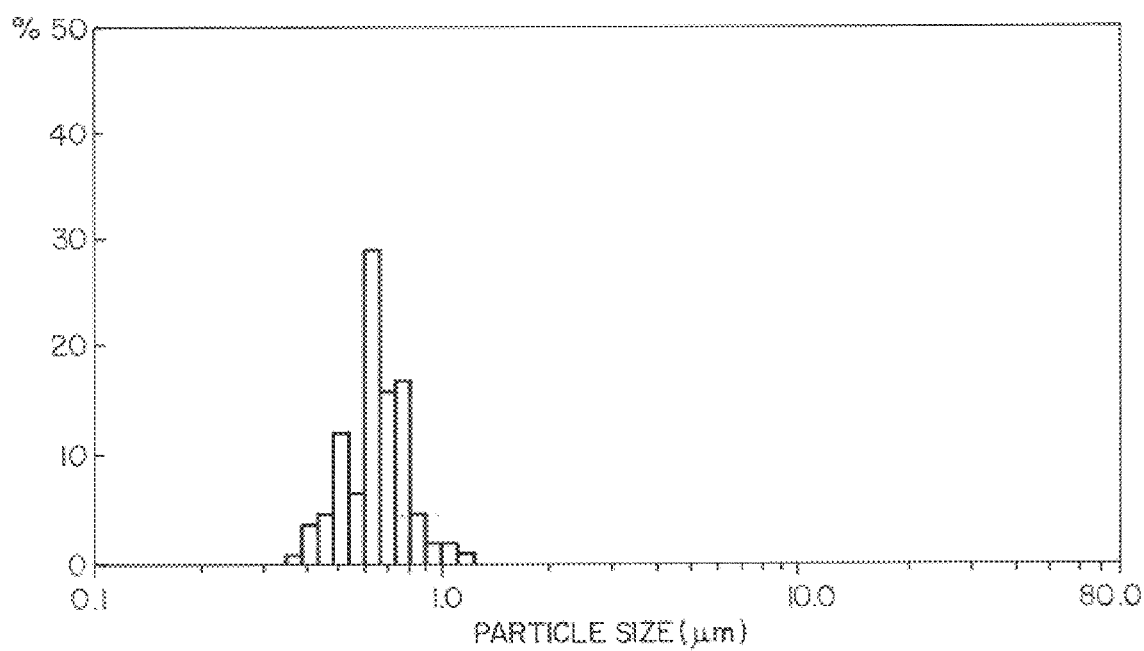
FIG. 2 shows a particle size distribution of the α-alumina powder produced in Example 5.

FIG. 1 is a scanning electron microscopic photograph of the α-alumina powder produced in Example 5, and FIG. 2 is a graph showing the particle size distribution of the α-alumina powder produced in Example 5.

EXAMPLE 6

The transition alumina powder (AKP-G15) (600 g) and, as a seed crystal, α-alumina powder (AKP-50) (34.8 g) were mixed and the mixture was granulated and calcined in the same manner as in Example 1 to obtain α-alumina powder. The obtained α-alumina powder was milled in the jet mill under air pressure of 6 kg/cm$^2$ at a powder supply rate of 2.4 kg/hr and heated in the air at 600° C. for 30 minutes to remove chlorine to obtain the desired α-alumina powder. The results are shown in Table 1.

EXAMPLE 7

The transition alumina powder (AKP-G15) (600 g) and, as a seed crystal, the α-alumina powder (AKP-50) (34.8 g) were mixed, and the mixture was granulated using the vertical granulator in the same manner as in Example 1 to obtain particles.

The particles (600 g) was filled in a graphite boat and calcined in a cylinder furnace having a quartz muffle. The temperture was raised at a heating rate of 500° C./hr using no diluent gas. When the temperature reached 400° C., only the bomb hydrogen chloride gas was supplied. A concentration of hydrogen chloride in the furnace atmosphere was controlled by adjusting flow rate of the hydrogen chloride gas by a flow meter. The flow amount of the atmosphere gas was adjusted to a linear velocity of 20 mm/min. A total pressure of the atmosphere gas was equal to the atmospheric pressure.

After reaching 600° C., that temperature was maintained for 90 minutes and then cooled spontaneously.

The obtained α-alumina powder was heated in the air at 600° C. for 30 minutes to remove chlorine and milled by the jet mill under air pressure of 6 kg/cm$^2$ at a powder supply rate of 2.4 kg/hr to obtain the desired α-alumina powder.

The results are shown in Table 1.

EXAMPLE 8

The transition alumina powder (AKP-G15) (600 g) and, as a seed crystal, the α-alumina powder (AKP-50) (34.8 g) were mixed, and the mixture was granulated using the vertical granulator in the same manner as in Example 1 to obtain particles.

The particles (600 g) was filled in a graphite boat and calcined in a cylinder furnace having a quartz muffle. The temperture was raised at a heating rate of 500° C./hr using no diluent gas. When the temperature reached 800° C., only the bomb chlorine gas was supplied. A concentration of chlorine in the furnace atmosphere was controlled by adjusting a flow rate of the chlorine gas by a flow meter. The flow amount of the atmosphere gas was adjusted to a linear velocity of 20 mm/min. A total pressure of the atmosphere gas was equal to the atmospheric pressure.

After reaching 1200° C., that temperature was maintained for 30 minutes and then cooled spontaneously to obtain α-alumina powder.

The obtained α-alumina powder was heated in the air at 600° C. for 30 minutes to remove chlorine and milled by the jet mill under air pressure of 6 kg/cm$^2$ at a powder supply rate of 2.4 kg/hr to obtain the desired α-alumina powder.

The results are shown in Table 1.

EXAMPLE 9

The transition alumina powder (AKP-G15) (600 g) and, as a seed crystal, the α-alumina powder (AKP-50) (34.8 g) were mixed, and the mixture was granulated using the vertical granulator in the same manner as in Example 1 to obtain particles.

The particles (600 g) was filled in a graphite boat and calcined in a cylinder furnace having a quartz muffle. The temperature was raised at a heating rate of 500° C./hr with flowing nitrogen gas. When the temperature reached 600° C., the bomb chlorine gas and steam were supplied using a nitrogen gas as a diluent gas. A concentration of chlorine in the furnace atmosphere was controlled by adjusting flow rates of the chlorine gas and the nitrogen gas by flow meters. The total flow amount of the atmosphere gas was adjusted to a linear velocity of 20 mm/min. A total pressure of the atmosphere gas was equal to the atmospheric pressure.

After reaching 800° C., that temperature was maintained for 90 minutes and then cooled spontaneously to obtain α-alumina powder.

The obtained α-alumina powder was milled by the jet mill under air pressure of 6 kg/cm$^2$ at a powder supply rate of 2.4 kg/hr and heated in the air at 600° C. for 30 minutes to remove chlorine to obtain the desired α-alumina powder.

The results are shown in Table 1.

EXAMPLE 10

The transition alumina powder (AKP-G15) (600 g) and, as a shape-regulating agent, MgO powder (manufactured by WAKO JUNYAKU Co., Ltd.) (18 g) were mixed, and the mixture was granulated using the vertical granulator in the same manner as in Example 1 to obtain particles.

The particles (600 g) was filled in a graphite boat and calcined in a cylinder furnace having a quartz muffle. The temperture was raised at a heating rate of 500° C./hr with flowing nitrogen gas. When the temperature reached 800° C., the bomb hydrogen chloride gas was supplied using a nitrogen gas as a diluent gas. A concentration of hydrogen chloride in the furnace atmosphere was controlled by adjusting flow rates of the hydrogen chloride gas and the nitrogen gas by flow meters. The total flow amount of the atmosphere gas was adjusted to a linear velocity of 20 mm/min. A total pressure of the atmosphere gas was equal to the atmospheric pressure.

After reaching 1100° C., that temperature was maintained for 30 minutes and then cooled spontaneously.

The obtained α-alumina powder was heated in the air at 600° C. for 30 minutes to remove chlorine to obtain the desired α-alumina powder.

The results are shown in Table 1.

EXAMPLE 11

The transition alumina powder (AKP-G15) (600 g), as a seed crystal, α-alumina powder (AKP-50) (34.8 g) and, as a shape-regulating agent, MgO powder (manufactured by WAKO JUNYAKU Co., Ltd.) (18 g) were mixed and the mixture was granulated using the vertical granulator in the same manner as in Example 1 to obtain particles.

The particles (600 g) were filled in a graphite boat and calcined in a cylinder furnace having a quartz muffle. The temperature was raised at a heating rate of 500° C./hr with flowing nitrogen gas. When the temperature reached 800° C., the bomb hydrogen chloride gas was supplied using a nitrogen gas as a diluent gas. A concentration of hydrogen chloride in the furnace atmosphere was controlled by adjusting flow rates of the hydrogen chloride gas and the nitrogen gas by flow meters. The total flow amount of the atmosphere gas was adjusted to a linear velocity of 20 mm/min. A total pressure of the atmosphere gas was equal to the atmospheric pressure.

After reaching 1100° C., that temperature was maintained for 30 minutes and then cooled spontaneously.

The obtained α-alumina powder was milled by the jet mill under air pressure of 6 kg/cm$^2$ at a powder supply rate of 2.4 kg/hr and heated in the air at 600° C. for 30 minutes to remove chlorine to obtain the desired α-alumina powder.

The results are shown in Table 1.

EXAMPLE 12

The transition alumina (AKP-G15) (600 g) and, as a seed crystal, α-alumina powder (AKP-50) (34.8 g) were mixed and the mixture was granulated and calcined in the same manner as in Example 1 to obtain α-alumina powder.

The obtained α-alumina powder was heated in the air at 1000° C. for 60 minutes to remove chlorine and milled in a jet mill under air pressure of 6 kg/cm$^2$ at a powder supply rate of 2.4 kg/hr to obtain desired α-alumina powder.

The results are shown in Table 1.

EXAMPLE 13

The transition alumina powder (AKP-G15) (600 g) and, as a seed crystal, α-alumina powder (AKP-50) (34.8 g) were mixed and the mixture was granulated using the vertical granulator in the same manner as in Example 1 to obtain particles.

The particles (600 g) were filled in a graphite boat and calcined in a cylinder furnace having a quartz muffle. The temperture was raised at a heating rate of 500° C./hr with flowing nitrogen gas. When the temperature reached 800° C., the bomb hydrogen chloride gas was supplied using a nitrogen gas as a diluent gas. A concentration of hydrogen chloride in the furnace atmosphere was controlled by adjusting flow rates of the hydrogen chloride gas and the nitrogen gas by flow meters. The total flow amount of the atmosphere gas was adjusted to a linear velocity of 20 mm/min. A total pressure of the atmosphere gas was equal to the atmospheric pressure.

After reaching 1100° C., that temperature was maintained for 30 minutes and then cooled spontaneously.

The obtained α-alumina powder was heated in an atmosphere consisting of 25% by volume of steam and 75% by volume of nitrogen at 500° C. for 60 minutes to remove chlorine and milled by the jet mill under air pressure of 6 kg/cm$^2$ at a powder supply rate of 2.4 kg/hr.

The results are shown in Table 1.

EXAMPLE 14

In the same manner as in Example 12 except that the dechlorination was carried out at 900° C., α-alumina powder was produced. The results are shown in Table 1.

EXAMPLE 15

In the same manner as in Example 12 except that the dechlorination was carried out at 1100° C. for 180 minutes in a pure nitrogen atmosphere, α-alumina powder was produced. The results are shown in Table 1.

EXAMPLE 16

In the same manner as in Example 12 except that the dechlorination was carried out at 1000° C. for 60 minutes under pressure of 0.1 Torr which was generated by a rotary pump (GVD-050A manufactured by SHINKU KIKO Co., Ltd.), α-alumina powder was produced. The results are shown in Table 1.

EXAMPLE 17

In the same manner as in Example 12 except that the dechlorination was carried out by washing α-alumina with water and drying it at 250° C. for 60 minutes, α-alumina powder was produced. The results are shown in Table 1.

EXAMPLE 18

The transition alumina (AKP-G15) (600 g) and, as a seed crystal, α-alumina powder (AKP-50) (34.8 g) were mixed and the mixture was granulated and calcined in the same manner as in Example 1 to obtain α-alumina powder.

The obtained α-alumina powder was heated in an autoclave at 180° C. for 2 hours to remove chlorine and milled in a jet mill under air pressure of 6 kg/cm$^2$ at a powder supply rate of 2.4 kg/hr to obtain the desired α-alumina powder.

The results are shown in Table 1.

EXAMPLES 19–22

In the same manner as in Example 6 except that the composition of the atmosphere gas, the calcining temperature and the calcining time were changed as shown in Table 1, α-alumina powder was produced. The results are shown in Table 1.

EXAMPLE 23

In the same manner as in Example 16 except that the granulation was carried out using a pan type granulator and an apparent bulk density was changed to 0.55 g/cm$^3$, the α-alumina powder was produced. The α-alumina powder had the $D_{90}/D_{10}$ ratio of 3 and the D/H ratio of 1.

COMPARATIVE EXAMPLE 1

The same aluminum hydroxide as prepared in Example 3 (200 g) was used as the starting alumina and calcined in the air in a cylinder furnace having a quartz muffle. The temperature was raised at a heating rate of 500° C./hr. After reaching 1100° C., that temperature was maintained for 30 minutes and then cooled spontaneously. But, the desired α-alumina powder was not produced. The results are shown in Table 1.

COMPARATIVE EXAMPLE 2

In the same manner as in Example 4 except that the transition alumina powder was not granulated, α-alumina powder was produced but had a low bulk density of 0.1 g/cm$^3$.

EXAMPLE 24

Aluminum hydroxide which was synthesized by hydrolyzing aluminum isopropoxide was used as an alumina starting material and granulated by a pan type granulator to obtain spherical particles having diameters of 2 to 3 mm. The particles were precalcined at 800° C. for 1 hour to obtain transition alumina having a BET surface area of 150 m$^2$/g.

The transition alumina (600 g) was charged in aluminmade calcining vessels and the vessels were conveyed in a pusher type tunnel furnace having a highest temperature homogeneously heating zone kept at 1100° C. by an electric heater at an interval of 17 minutes. One vessel per every ten vessels contained ammonium chloride (1.2 kg). Each vessel passed the homogeneously heating zone over a period of 1 hour. To supply hydrogen chloride gas which was generated by the decomposition of ammonium chloride in the high temperature zone of the calcining furnace, nitrogen gas was flowed from a gas inlet which was positioned on the raw material supply side. A concentration of hydrogen chloride in the atmosphere gas in the furnace was 18% by volume. The alumina obtained by calcining was alumina powder which consisted of α-alumina particles having a polyhedral shape and a number average particle size of 18 μm, and was easily milled.

EXAMPLE 25

The transition alumina which was granulated in the same manner as in Example 24 was calcined in the same manner as in Example 24 except the following conditions:

To each calcining vessel, ammonium chloride (200 g) was charged, and thereafter the transition alumina (400 g) was charged over ammonium chloride. Then the vessels were conveyed in the calcining furnace. No nitrogen gas was flowed. The concentration of hydrogen chloride in the atmosphere gas in the furnace was 25% by volume.

The alumina obtained by calcination was alumina powder which consisted of α-alumina particles having a polyhedral shape and a number average particle size of 18 μm, and was easily milled.

EXAMPLE 26

The transition alumina powder (AKP-G15) (30 kg), as a seed crystal, α-alumina powder (AKP-30 (trade name)

manufactured by Sumitomo Chemical Co., Ltd.) (900 g) and ammonium chloride (1.5 kg) were mixed in a twin-shell blender, and granulated by the vertical granulator. After drying at 120° C. for 1 hour, the mixed raw material (950 g) was charged in aluminmade calcining vessels and the vessels were conveyed in a pusher type tunnel furnace having a highest temperature homogeneously heating zone kept at 1100° C. by an electric heater at an interval of 8.5 minutes. Each vessel passed the homogeneously heating zone over a period of 0.5 hour. To supply hydrogen chloride gas which was generated by the decomposition of ammonium chloride in the high temperature zone of the calcining furnace, nitrogen gas was flowed from a gas inlet which was positioned on the raw material supply side. A concentration of hydrogen chloride in the atmosphere gas in the furnace was 3% by volume. The alumina obtained by calcination was alumina powder which consisted of α-alumina particles having a polyhedral shape and a number average particle size of 0.8 μm, and was easily milled.

COMPARATIVE EXAMPLE 3

In the same manner as in Example 23 except that ammonium chloride was not used, the transition alumina powder which mainly consisted of δ-alumina was obtained.

COMPARATIVE EXAMPLE 4

In the same manner as in Comparative Example 3 except that the homogeneously heating zone was heated at 1300° C., the transition alumina was calcined to obtain α-alumina powder which had nonuniform particle shape and a number average particle size of 0.4 μm and contained hard agglomerated particles.

TABLE 1

| | Starting Material | Granulation | Seed crystal | Shape-regulating agent | Apparent bulk density (g/cm$^2$) |
|---|---|---|---|---|---|
| Example 1 | Transition alumina | Yes | No | No | 0.35 |
| Example 2 | Transition alumina | Yes | No | No | 0.35 |
| Example 3 | Aluminum hydroxide | Yes | No | No | 0.45 |
| Example 4 | Transition alumina | Yes | Yes | No | 0.35 |
| Example 5 | Transition alumina | Yes | Yes | No | 0.35 |
| Example 6 | Transition alumina | Yes | Yes | No | 0.35 |
| Example 7 | Transition alumina | Yes | Yes | No | 0.35 |
| Example 8 | Transition alumina | Yes | Yes | No | 0.35 |
| Example 9 | Transition alumina | Yes | Yes | No | 0.35 |
| Example 10 | Transition alumina | Yes | No | Yes | 0.35 |
| Example 11 | Transition alumina | Yes | Yes | Yes | 0.35 |
| Example 12 | Transition alumina | Yes | Yes | No | 0.35 |
| Example 13 | Transition alumina | Yes | Yes | No | 0.35 |
| Example 14 | Transition alumina | Yes | Yes | No | 0.35 |
| Example 15 | Transition alumina | Yes | Yes | No | 0.35 |
| Example 16 | Transition alumina | Yes | Yes | No | 0.35 |
| Example 17 | Transition alumina | Yes | Yes | No | 0.35 |
| Example 18 | Transition alumina | Yes | Yes | No | 0.45 |
| Example 19 | Transition alumina | Yes | Yes | No | 0.35 |
| Example 20 | Transition alumina | Yes | Yes | No | 0.35 |
| Example 21 | Transition alumina | Yes | Yes | No | 0.35 |
| Example 22 | Transition alumina | Yes | Yes | No | 0.35 |
| Com. Ex. 1 | Aluminum hydroxide | Yes | No | No | 0.4 |
| Com. Ex. 2 | Transition alumina | No | Yes | No | 0.1 |

TABLE 1-continued

| | Sintering Temp. (° C.) | Sintering Time (min.) | Atmosphere gas comp. (vol. %) | | | |
|---|---|---|---|---|---|---|
| | | | HCl | Cl$_2$ | H$_2$O | N$_2$ |
| Example 1 | 1100 | 30 | 30 | | | 70 |
| Example 2 | 1100 | 30 | 30 | | | 70 |
| Example 3 | 1100 | 30 | 30 | | | 70 |
| Example 4 | 1100 | 30 | 30 | | | 70 |
| Example 5 | 1100 | 30 | 30 | | | 70 |
| Example 6 | 1100 | 30 | 30 | | | 70 |
| Example 7 | 600 | 90 | 100 | | | |
| Example 8 | 1200 | 30 | | 100 | | |
| Example 9 | 800 | 90 | | 30 | 5 | 65 |
| Example 10 | 1100 | 30 | 30 | | | 70 |
| Example 11 | 1100 | 30 | 30 | | | 70 |
| Example 12 | 1100 | 30 | 30 | | | 70 |
| Example 13 | 1100 | 30 | 30 | | | 70 |
| Example 14 | 1100 | 30 | 30 | | | 70 |
| Example 15 | 1100 | 30 | 30 | | | 70 |
| Example 16 | 1100 | 30 | 30 | | | 70 |
| Example 17 | 1100 | 30 | 30 | | | 70 |
| Example 18 | 1100 | 30 | 30 | | | 70 |
| Example 19 | 1100 | 180 | 5 | | | 95 |
| Example 20 | 1100 | 600 | 1 | | | 99 |
| Example 21 | 800 | 120 | 100 | | | |
| Example 22 | 900 | 30 | 100 | | | |
| Com. Ex. 1 | 1100 | 30 | In air | | | |
| Com. Ex. 2 | 1100 | 30 | 30 | | | 70 |

| | Alpha-alumina powder | | | | |
|---|---|---|---|---|---|
| | Comminution | Dechlorination | Concentration of Cl$_2$ (ppm) | Particle size (μm) | $D_{90}/D_{10}$ | D/H |
| Example 1 | No | No | 48 | 11 | 4 | 1 |
| Example 2 | No | Yes | 5 | 11 | 4 | 1 |
| Example 3 | No | Yes | 4 | 14 | 3 | 1 |
| Example 4 | No | Yes | 34 | 0.6 | 10 | 1 |
| Example 5 | Yes | Yes | 32 | 0.6 | 3 | 1 |
| Example 6 | Yes | Yes | 31 | 0.6 | 3 | 1 |
| Example 7 | Yes | Yes | 29 | 0.6 | | 1 |
| Example 8 | Yes | Yes | 32 | 0.6 | | 1 |
| Example 9 | Yes | Yes | 27 | 0.6 | | 1 |
| Example 10 | No | Yes | 7 | 11 | | 1.2 |
| Example 11 | Yes | Yes | 29 | 0.6 | | 1.2 |
| Example 12 | Yes | Yes | 4 | 0.6 | | 1 |
| Example 13 | Yes | Yes | 110 | 0.6 | 3 | 1 |
| Example 14 | Yes | Yes | 10 | 0.6 | 3 | 1 |
| Example 15 | Yes | Yes | 25 | 0.6 | 3 | 1 |
| Example 16 | Yes | Yes | 6 | 0.6 | 3 | 1 |
| Example 17 | Yes | Yes | 19 | 0.6 | 3 | 1 |
| Example 18 | Yes | Yes | 18 | 0.6 | 3 | 1 |
| Example 19 | Yes | Yes | 32 | 0.6 | 3 | 1 |
| Example 20 | Yes | Yes | 31 | 0.6 | 3 | 1 |
| Example 21 | Yes | Yes | 29 | 0.6 | 4 | 1 |
| Example 22 | Yes | Yes | 33 | 0.6 | 3 | 1 |
| Com. Ex. 1 | No | No | | 0.1 | 25 | nonuniform unmeasured |
| Com. Ex. 2 | No | No | 310 | 0.6 | | 1 |

What is claimed is:

1. A method for producing α-alumina powder comprising, in the following sequential order, the steps of:
   (i) granulating an alumina starting material, wherein said alumina starting material is at least one member selected from the group consisting of transition alumina and aluminum hydroxide, to obtain particles; having a bulk density of at least 0.15 g/cm$^3$;
   (ii) calcining s aid particles in an atmosphere which comprises hydrogen chloride gas and contains 30 to 100% by volume of the hydrogen chloride gas at a temperature of 600 to 1,200° C. for 1 to 120 minutes to form α-alumina powder; and
   (iii) milling said α-alumina powder with a jet mill to obtain α-alumina powder having a D/H ratio of 1 to 1.2 and a particle size of 0.6 to 18 μm.

2. The method according to claim 1, wherein said starting material contains at least one additive selected from the group consisting of a seed crystal and a shape-regulating agent.

3. The method according to claim 1 or 2, wherein said alumina starting material is calcined in a calcining furnace, and wherein said atmosphere containing a hydrogen chloride gas is generated by supplying at least one gas source selected from the group consisting of solid and liquid hydrogen chlorine gas sources to said calcining furnace.

4. The method according to claim 3, wherein said hydrogen chloride gas source is ammonium chloride.

5. The method according to claim 2, wherein said seed crystal is at least one compound selected from the group consisting of compounds of aluminum, titanium, vanadium, chromium, iron and nickel.

6. The method according to claim 2, wherein said shape-regulating agent is at least one metal selected from magnesium, calcium, strontium, yttrium, zirconium, niobium, vanadium, molybdenum, copper, zinc, boron, silicon, lanthanum, cerium, neodymium, and compounds thereof.

7. The method according to claim 1, wherein the milling with a jet mill is under an air pressure of 1 to 6 kg/cm$^2$.

8. A method for producing α-alumina powder comprising, in the following sequential order, the steps of:
   (i) granulating an alumina starting material to obtain particles, wherein said alumina starting material is at least one member selected from the group consisting of transition alumina and aluminum hydroxide and wherein said starting material contains at least one seed crystal additive selected from the group consisting of compounds of aluminum, titanium, vanadium, chromium, iron and nickel or at least one shape regulating agent selected from the group consisting of magnesium, calcium, strontium, yttrium, zirconium, niobium, vanadium, molybdenum, copper, zinc, silicon, lanthanum, cerrium, neodymium metals and compounds thereof;
   (ii) calcining said particles in an atmosphere which comprises hydrogen chloride gas and contains 30 to 100% by volume of the hydrogen chloride gas at a temperature of 600 to 1,200° C. for 1 to 120 minutes to form α-alumina powder; and
   (iii) milling said α-alumina powder with a jet mill to obtain α-alumina powder having a D/H ratio of 1 to 1.2 and a particle size of 0.6 to 18 μm.

9. A method for producing α-alumina powder comprising, in the following sequential order, the steps of:
   (i) granulating an alumina starting material to obtain particles, wherein said alumina starting material is at least one member selected from the group consisting of transition alumina and aluminum hydroxide and wherein said starting material contains at least one seed crystal additive selected from the group consisting of compounds of aluminum, titanium, vanadium, chromium, iron and nickel or at least one shape regulating agent selected from the group consisting of magnesium, calcium, strontium, yttrium, zirconium, niobium, vanadium, molybdenum, copper, zinc, silicon, lanthanum, cerium, neodymium metals and compounds thereof, wherein said seed crystal is capable of decreasing the particles size of the α-alumina powder as the amount of seed crystal is increased;
   (ii) calcining said particles in an atmosphere which comprises hydrogen chloride gas and contains 30 to 100% by volume of the hydrogen chloride gas at a temperature of 600 to 1,200° C. for 1 to 120 minutes to form α-alumina powder; and
   (iii) milling said α-alumina powder with a jet mill to obtain α-alumina powder having a D/H ratio of 1 to 1.2 and a particle size of 0.6 to 18 μm.

* * * * *